(12) United States Patent
Kojima et al.

(10) Patent No.: US 6,254,508 B1
(45) Date of Patent: Jul. 3, 2001

(54) ENGINE TORQUE CONTROL DURING MULTIPLE SPEED CHANGES OF AN AUTOMATIC TRANSMISSION

(75) Inventors: Kouichi Kojima; Hiroshi Tsutsui; Masao Saitou; Masaaki Nishida; Yoshihisa Yamamoto, all of Anjo (JP)

(73) Assignee: Aisin AW Co., Ltd. (JP)

( * ) Notice: Subject to any disclaimer, the term of this patent is extended or adjusted under 35 U.S.C. 154(b) by 0 days.

(21) Appl. No.: 09/425,190

(22) Filed: Oct. 25, 1999

(30) Foreign Application Priority Data

Oct. 30, 1998 (JP) ................................. 10-311266

(51) Int. Cl.$^7$ ................................. B60K 41/04
(52) U.S. Cl. ................................. 477/109
(58) Field of Search ................................. 477/109, 107, 477/110, 111, 143, 144, 154

(56) References Cited

U.S. PATENT DOCUMENTS

| | | | |
|---|---|---|---|
| 4,688,450 | 8/1987 | Hayashi et al. | 477/109 |
| 4,955,257 | * 9/1990 | Terayama et al. | 477/154 |
| 5,036,728 | * 8/1991 | Kawasoe et al. | 477/109 |
| 5,058,013 | * 10/1991 | Iwatsuki et al. | 477/109 X |
| 5,697,860 | * 12/1997 | Shimei et al. | 477/143 X |
| 5,941,795 | * 8/1999 | Tsuchiya et al. | 477/143 X |
| 5,957,810 | * 9/1999 | Ohashi et al. | 477/154 |
| 6,186,923 | * 2/2001 | Popp et al. | 477/154 X |

* cited by examiner

Primary Examiner—Charles A Marmur
Assistant Examiner—Ankur Parekh
(74) Attorney, Agent, or Firm—Lorusso & Loud

(57) ABSTRACT

In a multiple speed-change operation for switching between an up-shift operation and a down-shift operation, engine torque control is adapted to an actual change in speed-change state, whereby an abrupt change in rotational speed of the input shaft is prevented. One embodiment relates to a speed-change operation from the second speed to the third speed, wherein the engagement-side hydraulic pressure B4 rises and the release-side hydraulic pressure B5 drops, the rotational speed $N_T$ of the input shaft changes from a second speed state toward a third speed state and the engine torque $T_E$ is reduced by a predetermined amount TCU. If a command to perform a speed-change operation from the third speed to the second speed is issued during the aforementioned speed-change operation from the second speed to the third speed, control of the hydraulic pressures is switched to the speed-change operation from the third speed to the second speed. If it is detected because of the hydraulic pressure control that the direction of the change ω in rotational speed of the input shaft has changed toward the second speed, it is determined that the speed-change operation has actually started. Then, the torque reduction operation is suspended, and the torque is gradually restored.

14 Claims, 14 Drawing Sheets

FIG. 3

| | C1 | C2 | C3 | B1 | B2 | B3 | B4 | B5 | F1 | F2 |
|---|---|---|---|---|---|---|---|---|---|---|
| N | | | | | | | | O | | |
| 1ST | O | | | | | ◌ | | O | | O |
| 2ND | O | | | ☐ | O | | | O | O | |
| 3RD | O | | | O | O | | O | | O | |
| 4TH | O | | O | O | O | | | | O | |
| 5TH | O | O | O | | O | | | | | |
| 3Low | O | O | | | O | | | O | | |
| 4Low | O | O | | | O | | O | | | |
| REV | | O | | | | O | | O | | |

THE DOTTED CIRCLE REPRESENTS AN OPERATION PERFORMED AT THE TIME OF ENGINE BRAKING.

THE SQUARE REPRESENTS AN OPERATION PERFOMED IN CASE OF NECESSITY.

(a)

(b)

MULTIPLE SPEED-CHANGE CONTROL FROM SECOND SPEED
THROUGH THIRD SPEED TO SECOND SPEED (a)

(b)

US 6,254,508 B1

ENGINE TORQUE CONTROL DURING MULTIPLE SPEED CHANGES OF AN AUTOMATIC TRANSMISSION

INCORPORATION BY REFERENCE

The disclosure of Japanese Patent Application No. HEI 10-311266 filed on Oct. 30, 1998 including the specification, drawings and abstract is incorporated herein by reference in its entirety.

BACKGROUND OF THE INVENTION

1. Field of the Invention

The present invention relates to a speed-change control apparatus for an automatic transmission that is installed in a motor vehicle and, more specifically, to a speed-change control apparatus for controlling both engine torque and hydraulic pressure for changing speed stages and, in particular, to a speed-change control apparatus which provides a multiple speed-change operation wherein, during a certain speed-change operation, a command to establish another speed stage is issued.

2. Description of the Related Art

U.S. Pat. No. 4,688,450 discloses a speed-change control apparatus for changing engine torque during a speed-change operation. This speed-change control apparatus relates to speed-change control wherein during a certain (first) speed-change operation, a command to establish another (second) speed-change stage is issued. In this speed-change control apparatus, if a command to perform the second speed-change operation is issued prior to termination of the first speed-change operation, the engine torque control is suspended immediately as to both the first and second speed-change operations.

For example, as shown in FIG. 11, during an up-shift operation (e.g. from the first speed to the second speed), as the speed-change operation proceeds through engagement and disengagement of frictional engagement elements, the rotational speed $N_T$ of the input shaft continues to rise with a low-speed gear ratio in a torque phase, whereas the rotational speed of the input shaft falls toward a high-speed gear ratio in an inertia phase (see the line of alternating short and long dashes in FIG. 11). In this state, if it is determined that the inertia phase has been reached based on detection of a change in rotational speed of the input shaft, a control routine is performed to reduce the engine torque $T_E$ by the predetermined amount ($T_C$). Then, if a command to perform a down-shift operation (e.g. from the second speed to the first speed) is issued, the aforementioned engine torque control is suspended immediately. Then, a command to set the engine torque back to an intrinsic torque $T_E$ is issued.

In the aforementioned speed-change control apparatus, upon issuance of a command to perform the second speed-change (down-shift) operation, the hydraulic pressure that is on the engagement side during the first speed-change (up-shift) operation is reduced immediately, so that a change in rotational speed (a rise in rotational speed of the input shaft) is generated through the second speed-change (down-shift) operation. On the other hand, as described above, a command to suspend the engine torque control is also issued immediately in response to the command to perform the second speed-change (down-shift) operation. Therefore, the rotational speed of the input shaft tends to rise. In circumstances where the engine torque may change abruptly, the hydraulic pressure control needs to be performed during the second speed-change (down-shift) operation. However, the characteristic of the feedback control of the aforementioned hydraulic pressure for change in rotational speed of the input shaft is unsuitable. That is, as indicated by a dotted line in FIG. 11, the rotational speed $N_T$ of the input shaft rises abruptly and tends to overshoot.

SUMMARY OF THE INVENTION

It is thus an object of the present invention to provide a speed-change control apparatus for an automatic transmission that solves the above-described problem by changing engine torque control in a state where the second speed-change operation (the other speed-change operation) has actually started.

According to the present invention, there is provided a speed-change control apparatus for an automatic transmission, comprising an input shaft, an output shaft, a plurality of frictional engagement elements, hydraulic servos, hydraulic pressure control means, engine control means, a control unit, multiple speed-change determination means, hydraulic pressure command means, speed-change start determination means and engine torque change means. The input shaft, receives power from an engine output shaft. The output shaft is coupled to the vehicle wheels. The frictional engagement elements change power transmission paths between the input shaft and the output shaft of the transmission. The hydraulic servos operate to engage and release the frictional engagement elements. The hydraulic pressure control means controls hydraulic pressures applied to the hydraulic servos and the engine control means controls an output torque of the engine. The control unit receives signals from respective sensors which monitor various vehicle running conditions and outputs signals to the hydraulic pressure control means and the engine control means. The multiple speed-change determination means determines that during one of an up-shift speed-change operation and a down-shift speed-change operation, a command to perform the other speed-change operation has been issued. The hydraulic pressure command means switches a hydraulic pressure command for performing one of the speed-change operations to a hydraulic pressure command for performing the other of the speed-change operations, and outputs the latter to the hydraulic pressure control means based on the determination of the multiple speed-change operation. The speed-change start determination means detects that one of the speed-change operations has been switched to the other by hydraulic pressure control performed by the hydraulic pressure control means responsive to the hydraulic pressure command, and determines that the other (second) speed-change operation has actually started. The engine torque change means issues a command to change torque-down control by the engine control means responsive to determination of the second start of the speed-change operation.

In the speed-change operations, the hydraulic pressure supplied to the hydraulic servo for one of the frictional engagement elements is raised, and the hydraulic pressure supplied to the hydraulic servo for the other frictional engagement element is lowered to effect either an up-shift speed-change operation or a down-shift speed-change operation. During an up-shift operation, the torque capacity of the one frictional engagement element increases. The engine control means reduces the engine torque by a predetermined amount when there occurs a change in rotational speed of the input shaft (inertia phase).

During one of the speed-change operations, if a command to perform the other (second) speed-change operation is issued, the hydraulic pressure command means suspends the one speed-change operation immediately, and lowers the hydraulic pressure for the one frictional engagement element and raises the hydraulic pressure for the other frictional engagement element in executing the second speed-change operation. Based on the command to raise the hydraulic pressure for the other frictional engagement element, the start of the other speed-change operation is determined, i.e., it is determined that the one speed-change operation has been replaced by the other and that the actual speed-change state has changed.

Based on determination of the start of the second speed-change operation, for example in the case where an up-shift operation has been replaced by a down-shift operation, the torque-down control which accompanies the up-shift operation is suspended and the torque is restored with a predetermined gradient. In the case where a down-shift operation has been replaced by an up-shift operation, the torque-down output is changed such that the torque-down control during the aforementioned up-shift operation is started. As indicated by a solid line in FIG. 11, for example, the torque-down control for the engine is thereby restored after the actual second speed-change operation has started. Thus, the rotational speed $N_T$ of the input shaft rises smoothly without overshooting.

With the above-described system, after the hydraulic pressure control has started to proceed toward the other (second) speed-change operation, because the torque control is changed only after the actual speed-change operation has started, there is no possibility of an abrupt change in torque upon start of the control for changing the hydraulic pressure. Thus, the multiple speed-change operation can be performed smoothly from the up-shift operation to the down-shift operation and vice versa.

The speed-change start determination means may be designed to detect and determine that the direction of change in rotational speed of the input shaft has changed. In other words, the start of the second speed-change operation is determined by detecting that the direction of change in rotational speed of the input shaft has shifted from one speed-change direction to the other. Therefore, it is possible to determine the actual start of the second speed-change operation easily and reliably.

The engine control means may be designed to reduce engine torque by a predetermined amount when (1) a hydraulic pressure applied to the hydraulic servo for the engagement side frictional engagement element during an up-shift operation and (2) a torque capacity of the engagement side frictional engagement element both increase.

The present invention is adaptable to control wherein the engine torque is reduced by a predetermined amount during an up-shift operation. The hydraulic pressure for the engagement-side frictional engagement element is lowered, and the speed-change operation based on a smooth half-clutch state can be maintained even in switching between the up-shift and down-shift operations.

One of the speed-change operations may be an up-shift operation and the other may be a down-shift operation, and the engine torque change means may be designed to issue a command to suspend reduction of the engine torque by the predetermined amount, based on the determination of the start of the second speed-change operation.

Accordingly, the torque-down control in switching from an up-shift operation to a down-shift operation is suspended when the actual downshift speed-change operation has started. Therefore, it is possible to prevent an abrupt change in progress of the speed-change operation (rotational speed of the input shaft) and to perform the speed-change operation smoothly. Likewise, the torque-down control in switching from the down-shift operation to the up-shift operation is suspended in a state where the actual up-shift speed-change operation has started. Therefore, it is possible to reduce clamping force applied to the engagement-side frictional engagement element and to perform the speed-change operation smoothly and rapidly.

The engine control means may be designed to gradually raise the engine torque to an intrinsic torque, with a predetermined gradient, after suspension or termination of reduction of the engine torque, by the predetermined amount. In this manner, the torque is gradually restored after suspension or termination of the torque-down control. Therefore, it is possible to prevent an abrupt change in torque with higher reliability and to perform the speed-change operation smoothly.

BRIEF DESCRIPTION OF THE DRAWINGS

The foregoing and further objects, features and advantages of the present invention will become apparent from the following description of a preferred embodiment with reference to the accompanying drawings, wherein:

FIG. 3 is a table of operations of frictional engagement elements of the automatic transmission;

DETAILED DESCRIPTION OF PREFERRED EMBODIMENT

An embodiment of the present invention will be described hereinafter with reference to the drawings.

Figure 2:
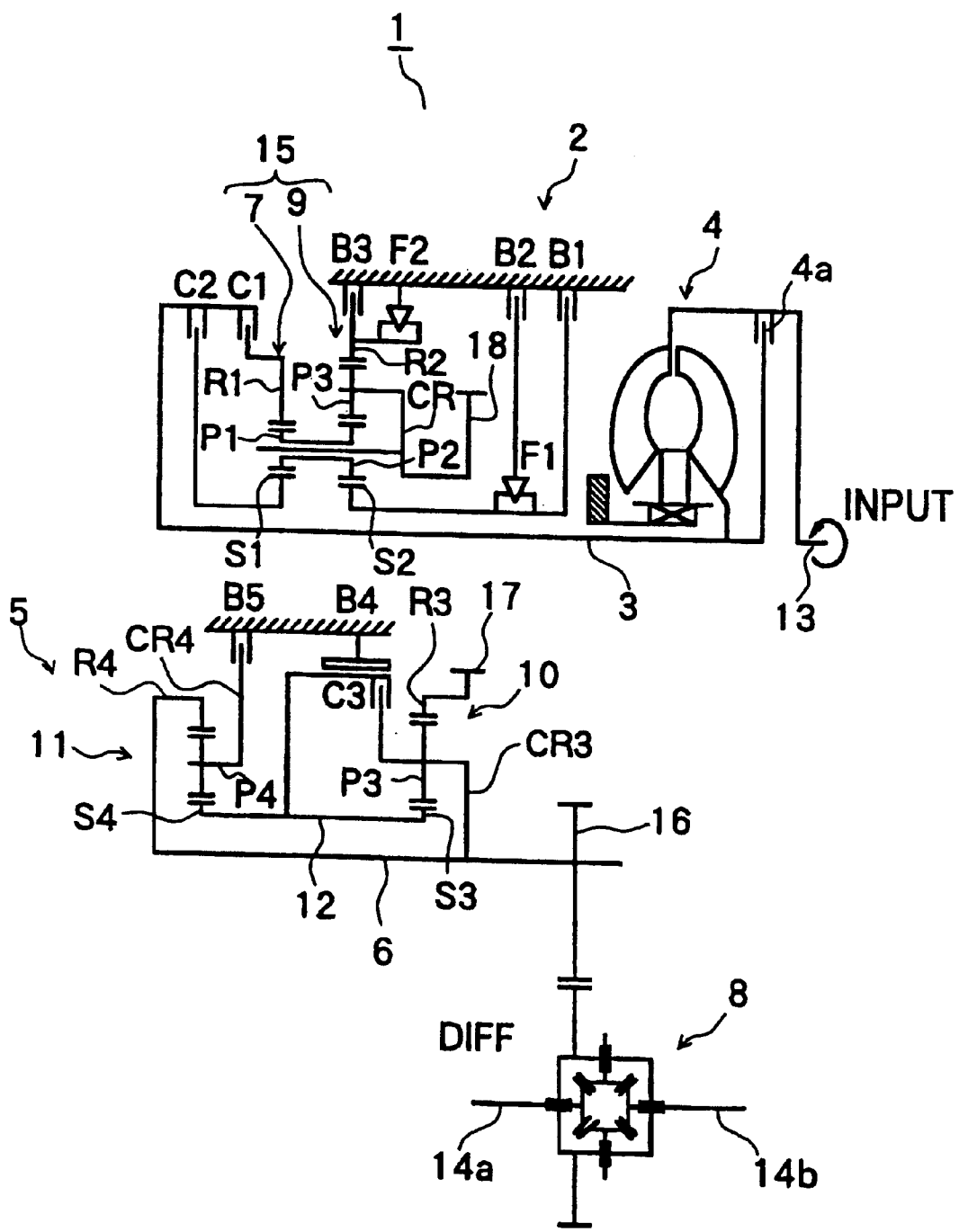
FIG. 2 is a skeletal diagram showing a mechanical section of an automatic transmission to which the present invention can be applied.

As shown in FIG. 2, a five-speed automatic transmission 1 is provided with a torque converter 4, a three-speed primary speed-change mechanism 2, a three-speed secondary speed-change mechanism 5 and a differential 8, which are interconnected to one another and accommodated in an integral-type casing. The torque converter 4 is provided with a lock-up clutch 4a. Power is inputted to an input shaft 3 of the primary speed-change mechanism 2 from an engine crank shaft 13 through oil flowing in the torque converter or through mechanical connection based on the lock-up clutch. The first shaft 3 (more specifically, input shaft), a second shaft 6 (counter shaft) and third shafts 14a and 14b (left and right vehicle axles) are rotatably supported by the integral-type casing. The first shaft 3 is aligned with the crank shaft, and the second shaft 6 and the third shafts 14a and 14b are parallel to the first shaft 3. A valve body is disposed on the exterior of the casing.

The primary speed-change mechanism 2 has planetary gearing 15 composed of a simple planetary gear unit 7 and a double pinion planetary gear unit 9. The simple planetary gear unit 7 is composed of a sun gear S1, a ring gear R1 and a carrier CR supporting a pinion P1 that engages the gears S1 and R1. The double pinion planetary gear unit 9 is composed of a sun gear S2, a ring gear R2 and the carrier CR. The number of teeth of the sun gear S2 is different from that of the sun gear S1. Together with the pinion P1 of the simple planetary gear unit 7, the carrier CR commonly supports a pinion P2 engaging the sun gear S2 and a pinion P3 engaging the ring gear R2.

The input shaft 3, which is connected with the engine crank shaft 13 through the torque converter 4, can be coupled to the ring gear R1 of the simple planetary gear unit 7 through a first (forward) clutch C1, and can be coupled to the sun gear S1 of the simple planetary gear unit 7 through a second (direct) clutch C2. The sun gear S2 of the double pinion planetary gear unit 9 can directly engage a first brake B1, and can engage a second brake B2 through a first one-way clutch F1. Furthermore, the ring gear R2 of the double pinion planetary gear unit 9 can engage a third brake B3 and a second one-way clutch F2. The common carrier CR is coupled to a counter drive gear 18, which is an output member of the primary speed-change mechanism 2.

On the other hand, the secondary speed-change mechanism 5 has an output gear 16, a first simple planetary gear unit 10 and a second simple planetary gear unit 11, which are arranged in this order transversally toward the rear side in the axial direction of the counter shaft 6 constituting the second shaft. The counter shaft 6 is rotatably supported by the integral-type casing through a bearing. The first and second simple planetary gear units 10 and 11 are of a Simpson type.

The first simple planetary gear unit 10 has a ring gear R3 and a sun gear S3. The ring gear R3 is coupled to a counter driven gear 17 that engages the counter drive gear 18, and the sun gear S3 is fixed to a sleeve shaft 12 that is rotatably supported by the counter shaft 6. The pinion P3 is supported by a carrier CR3, which is composed of a flange integrally coupled to the counter shaft 6. The carrier CR3, which supports the other end of the pinion P3, is coupled to an inner hub of a UD direct clutch C3. The second simple planetary gear unit 11 has a sun gear S4 and a ring gear R4. The sun gear S4 is formed on the sleeve shaft 12 and coupled to the sun gear S3 of the first simple planetary gear unit 10. The ring gear R4 is coupled to the counter shaft 6.

The UD direct clutch C3 is interposed between the carrier CR3 of the first simple planetary gear unit 10 and the coupled sun gears S3 and S4. The coupled sun gears S3 and S4 can engage a fourth brake B4, which is a band brake. Furthermore, a carrier CR4 for supporting a pinion P4 of the second simple planetary gear unit 11 can engage a fifth brake B5.

The operation of a mechanical section of the five-speed automatic transmission will now be described with reference to FIGS. 2 and 3.

In a first (1ST) speed state in a D (drive) range, the forward clutch C1 is connected, and the fifth brake B5 and the second one-way clutch F2 are engaged, so that the ring gear R2 of the double pinion planetary gear unit 9 and the carrier CR4 of the second simple planetary gear unit 11 are maintained in a stopped state. In this state, rotation of the input shaft 3 is transmitted to the ring gear R1 of the simple planetary gear unit 7 through the forward clutch C1, and the ring gear R2 of the double pinion planetary gear unit 9 is in a stopped state. Therefore, while both the sun gears S1 and S2 are idle-rotated in a reverse direction, the common carrier CR is rotated in a positive direction with a significant deceleration. That is, the primary speed-change mechanism 2 is in the first speed state, and the decelerated rotation is transmitted to the ring gear R3 of the first simple planetary gear unit 10 in the secondary speed-change mechanism 5 through counter gears 18 and 17. The secondary speed-change mechanism 5 is in the first speed state, with the carrier CR4 of the second simple planetary gear unit 11 being stopped by the fifth brake 35. The decelerated rotation of the primary speed-change mechanism 2 is further decelerated by the secondary speed-change mechanism 5 and outputted from the output gear 16.

In a second (2ND) speed state, the second brake B2 (and the first brake BE) operate in addition to the forward clutch C1. Moreover, operation is switched from the second one-way clutch F2 to the first one-way clutch F1, and the fifth brake B5 is maintained in a state of engagement. In this state, the sun gear S2 is stopped by the second brake B2 and the first one-way clutch F1. Therefore, rotation of the ring gear R1 of the simple planetary gear that has been transmitted from the input shaft 3 through the forward clutch C1 causes the carrier CR to rotate in the positive direction with deceleration, while idle-rotating the ring gear R2 of the double pinion planetary gear unit in the positive direction. Furthermore, the decelerated rotation is transmitted to the secondary speed-change mechanism 5 through the counter gears 18 and 17. That is, the primary speed-change mechanism 2 is in the second speed state, and the secondary speed-change mechanism 5 is in the first speed state due to engagement of the fifth brake B5. Thus, the second speed state is combined with the first speed state, whereby the second speed is obtained in the automatic transmission 1 as a whole. In this state, the first brake B1 is also in a state of operation. However, if the second speed is obtained through coast-down, the first brake B1 is released.

In a third (3RD) speed state, the forward clutch C1, the second brake B2, the first one-way clutch F1 and the first brake B1 are still maintained in a state of engagement. In this state, the fifth brake B5 is released and the fourth brake B4 is engaged. That is, the primary speed-change mechanism 2 is maintained as it is, and the rotation at the time of the aforementioned second speed is transmitted to the secondary speed-change mechanism 5 through the counter gears 18 and 17. Then, in the secondary speed-change mechanism 5, the rotation transmitted from the ring gear R3 of the first simple planetary gear unit 10 is output from the carrier CR3 as second speed rotation, due to fixation of the sun gear S3 and the sun gear S4. Accordingly, the second speed state of the primary speed-change mechanism 2 is combined with the second speed state of the secondary speed-change mechanism 5, whereby the third speed state is obtained in the automatic transmission 1 as a whole.

In a fourth (4TH) speed state, the primary speed-change mechanism 2 is in the same state as the aforementioned second and third speed states, with the forward clutch C1, the second brake B2, the first one-way clutch F1 and the first brake B1 being engaged. In the secondary speed-change mechanism 5, the fourth brake B4 is released and the UD direct clutch C3 is engaged. In this state, the carrier CR3 and the sun gears S3 and S4 of the first simple planetary gear unit 10 are coupled to each other, so that the planetary gear units 10 and 11 rotate integrally and hence carry out direct-coupled rotation. Thus, the second speed state of the primary speed-change mechanism 2 is combined with the direct-coupled (third speed) state of the secondary speed-change mechanism 5, whereby the fourth speed rotation is output from the output gear 16 in the automatic transmission as a whole.

In a fifth (5TH) speed state, the forward clutch C1 and the direct clutch C2 are engaged, and rotation of the input shaft 3 is transmitted to both the ring gear R1 and the sun gear S1 of the simple planetary gear unit 7. As a result, the primary speed-change mechanism 2 becomes direct-coupled and the gear unit rotates integrally. In this state, the first brake is released and the second brake B2 is maintained in a state of engagement. However, the first one-way clutch F1 idle-rotates, whereby the sun gear S2 idle-rotates. The secondary speed-change mechanism 5 10, provides direct-coupled rotation in which the UD direct clutch C3 is engaged. Thus, the third speed (direct-coupled) state of the primary speed-change mechanism 2 is combined with the third speed (direct-coupled) state of the secondary speed-change mechanism 5, whereby the fifth speed rotation is outputted from the output gear 16 in the automatic transmission as a whole.

Furthermore, this automatic transmission is provided with intermediate speed-change stages operating at the time of down-shift such as in acceleration of the vehicle, namely, a third speed low stage and a fourth speed low stage.

In a third speed low state, the forward clutch C1 and the direct clutch C2 are connected (the second brake B2 is in a state of engagement but overruns due to the one-way clutch F1), and the primary speed-change mechanism 2 is in the third speed state in which the planetary gear unit 15 is directly coupled. On the other hand, the secondary speed-change mechanism 5 is in the first speed state with the fifth brake B5 being engaged. Accordingly, the third speed state of the primary speed-change mechanism 2 is combined with the first speed state of the secondary speed-change mechanism 5, whereby the aforementioned speed-change stage for establishing a gear ratio between the second and third speeds is obtained in the automatic transmission 1 as a whole.

In a fourth speed low state, the forward clutch C1 and the direct clutch C2 are connected, and the primary speed-change mechanism 2 is in the third speed (direct-coupled) state, as in the aforementioned third speed low state. On the other hand, the secondary speed-change mechanism 5 is in the second speed state in which the fourth brake B4 is engaged and the sun gear S3 of the first simple planetary gear unit 10 and the sun gear S4 of the second simple planetary gear unit 11 are fixed. Thus, the third speed state of the primary speed-change mechanism 2 is combined with the second speed state of the secondary speed-change mechanism 5, whereby the aforementioned speed-change stage for establishing a gear ratio between the second and third speeds is obtained in the automatic transmission 1 as a whole.

A dotted circle in FIG. 3 denotes the operational state (four, three or two ranges) of engine brake at the time of coast running. That is, in the first speed state, the third brake B3 operates to prevent rotation of the ring gear R2 resulting from overrunning of the second one-way clutch F2. In the second, third and fourth speed states, the first brake B1 operates to prevent rotation of the sun gear S1 resulting from overrunning of the first one-way clutch F1. A square in FIG. 3 denotes release control of the first brake B1 at the time of coast-down from the third speed to the second speed. More specifically, in starting the speed-change operation, the brake B1 is first released. In this state, the interchange speed-change operation (the clutch-to-clutch speed-change operation) is performed by releasing the fourth brake B4 and engaging the fifth brake B5, and the second speed is established by engaging the first one-way clutch F1. Thereafter, the first brake B1 is engaged. In this process, since the first brake B1 is engaged after engagement of the first one-way clutch F1, a hydraulic pressure is supplied by switching the shift valve without performing hydraulic pressure control.

In a R (reverse) range, the direct clutch C2 and the third brake B3 are engaged, and the fifth brake B5 is also engaged. In this state, rotation of the input shaft 3 is transmitted to the sun gear S1 through the direct clutch C2, and the ring gear R2 of the double pinion planetary gear unit 9 is in a stopped state due to the third brake B3. The carrier CR rotates reversely while causing the ring gear R1 of the simple planetary gear unit 7 to rotate in reverse. This reverse rotation is transmitted to the secondary speed-change mechanism 5 through the counter gears 18 and 17. The secondary speed-change mechanism 5 is maintained in the first speed state in which the carrier CR4 of the second simple planetary gear unit 11 is also stopped in the direction of reverse rotation based on the fifth brake B5. Thus, reverse rotation of the primary speed-change mechanism 2 is combined with the first speed rotation of the secondary speed-change mechanism 5, whereby decelerated reverse rotation is outputted from the output shaft 16.

Figure 1:
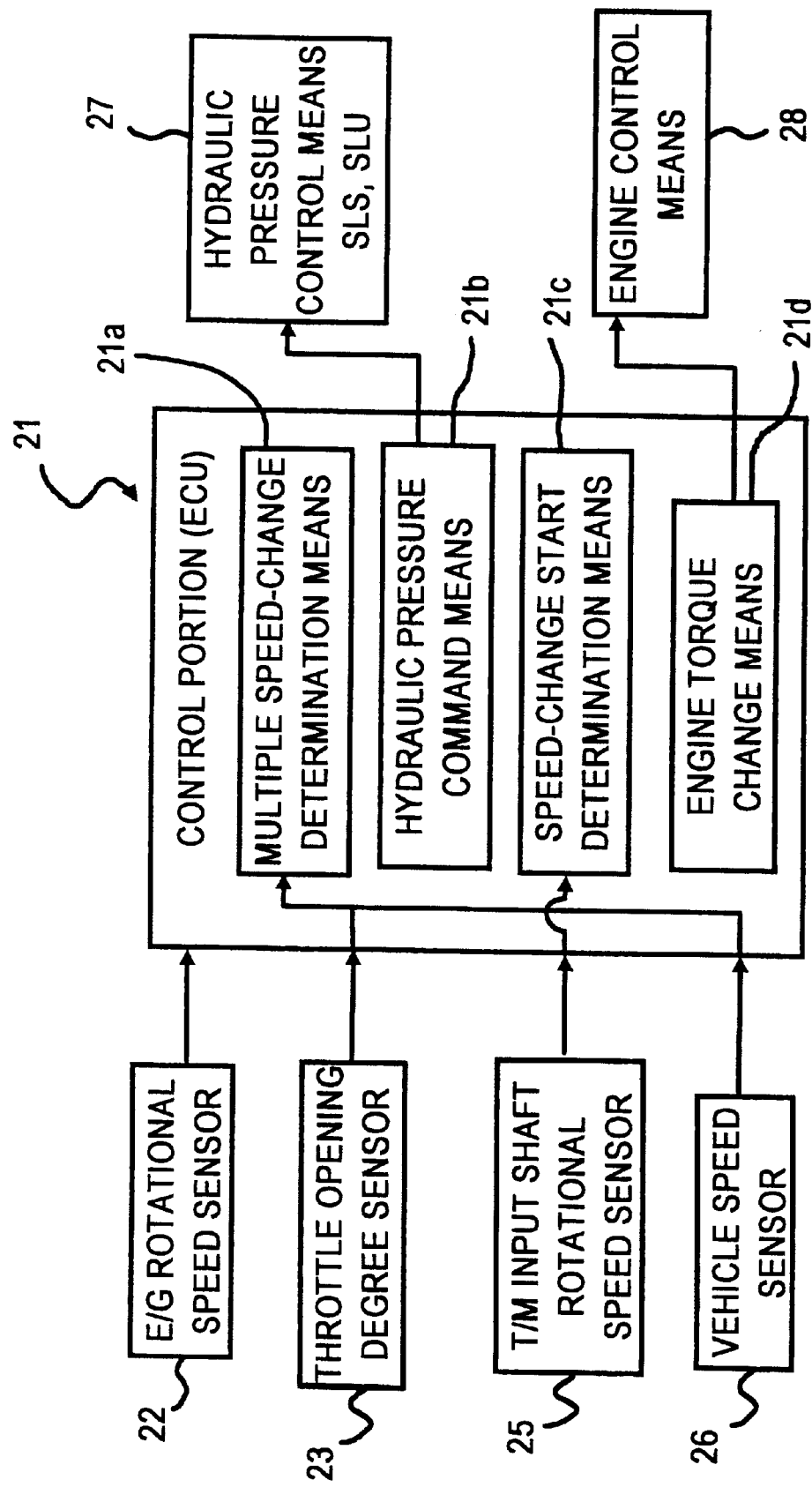
FIG. 1 is a block diagram showing an electronic control unit according to the present invention.

FIG. 1 is a block diagram illustrating an electronic control system. Reference numeral 21 denotes a control unit (ECU) composed of a microcomputer. Various signals from an engine rotational speed sensor 22, a throttle opening degree sensor 23 for detecting an amount of depression of the accelerator pedal by the driver, a sensor 25 for detecting a rotational speed of the input shaft (turbine) of the transmission (automatic speed-change mechanism), a vehicle speed sensor 26 (for detecting a rotational speed of the output shaft of the automatic transmission) and the like are input to the control unit 21. The control unit 21 outputs signals to hydraulic pressure control means 27, including linear solenoid valves SLS and SLU in a hydraulic circuit, and to engine control means 28, including an ignition timing changing device, an electronic throttle system and the like. The control unit 21 is provided with multiple speed-change determination means 21a, hydraulic pressure command means 21b, speed-change start determination means 21c and engine torque change means 21d. The multiple speed-change determination means 21a determines that, during one of an up-shift operation and down-shift operation, a command to perform the other operation has been issued, i.e., multiple speed change operations. Based on the determination of the multiple speed-change operations, the hydraulic pressure command means 21b switches from a hydraulic pressure command to perform the aforementioned one of the speed-change operations to a hydraulic pressure command to perform the other and outputs a corresponding signal to the hydraulic pressure control means 27. The speed-change start determination means 21c detects that the one speed-change operation has been replaced by the other, responsive to the hydraulic pressure control by the hydraulic pressure control means based on the hydraulic pressure command, and determines that the other speed-change operation has actually been started. Based on the determination of the start of the other speed-change operation, the engine torque change means 21d issues a command to change a torque-down output from the engine control means.

Figure 4:
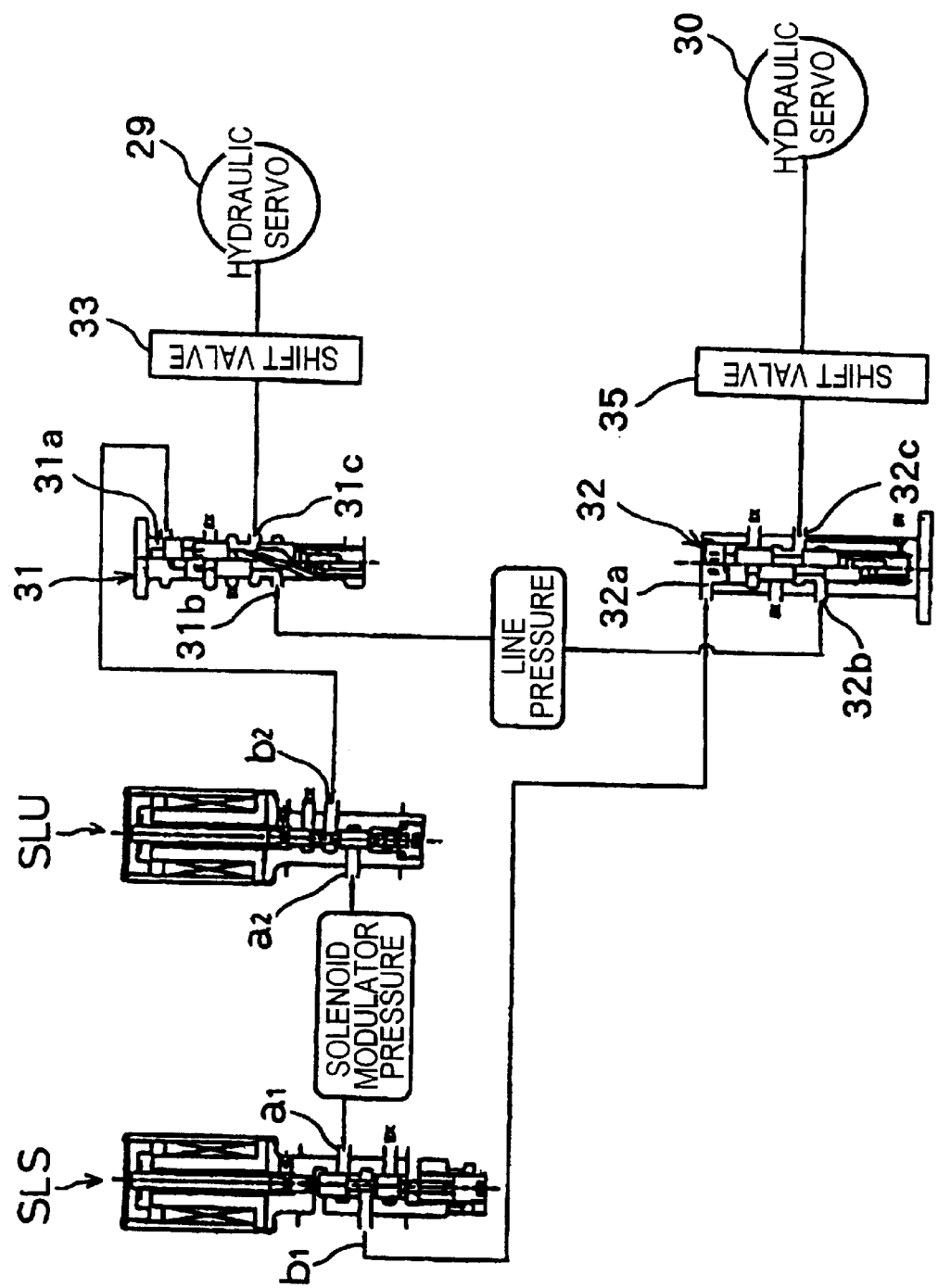
FIG. 4 is a schematic hydraulic control circuit for a clutch-to-clutch speed-change operation.

FIG. 4 schematically shows the hydraulic circuit, which includes the linear solenoid valves SLS and SLU and a plurality of hydraulic servos 29 and 30. In switching torque transmission paths in the planetary gearing of the automatic speed-change mechanism, the hydraulic servos 29 and 30 serve to engage and release a plurality of frictional engagement elements (clutches and brakes) for establishing a new speed stage among, for example, five forward speed stages and one reverse speed stage. Solenoid modulator pressures are supplied to input ports a1 and a2 of the linear solenoid valves SLS and SLU. Controlled hydraulic pressures from output ports b1 and b2 of the linear solenoid valves are supplied to control hydraulic chambers 31a and 32a of pressure control valves 31 and 32, respectively. Line pressures are supplied to input ports 31b and 32b of the pressure control valves 31 and 32 respectively. Regulated hydraulic pressures from output ports 31c and 32c, which are regulated by the aforementioned controlled hydraulic pressures, are suitably supplied to the hydraulic servos 29 and 30 through shift valves 33 and 35, respectively.

This hydraulic circuit is designed to provide a so-called clutch-to-clutch speed-change operation in which one frictional engagement element is released and the other frictional engagement element is engaged. Only hydraulic servos 29 and 30 and the shift valves 33 and 35 are shown for illustration; however, in practice, a multitude of hydraulic servos are provided in accordance with the particular automatic speed-change mechanism. To be more specific, the hydraulic circuit is provided with hydraulic servos for the fourth brake B4 and the fifth brake B5 that are used in shifting from the third speed to the second speed, and with hydraulic servos for the third clutch C3 and the fourth brake B4 that are used in shifting from the fourth speed to the third speed. The hydraulic circuit is also provided with a multitude of shift valves for switching hydraulic pressures to be supplied to the hydraulic servos.

Figure 5:
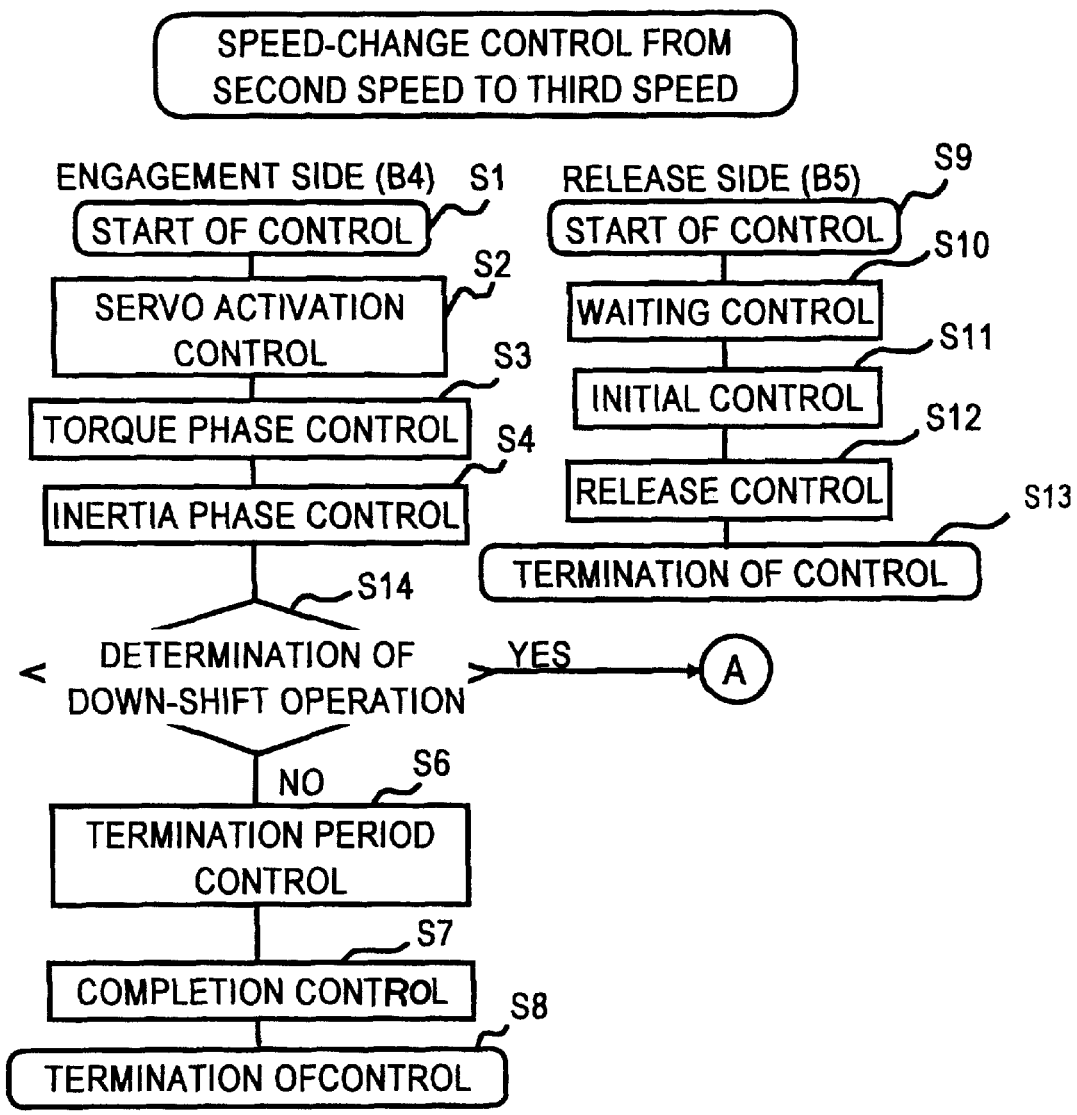
FIGS. 5(a) and 5(b) are flowcharts of a routine for a multiple speed-change operation from the second speed through the third speed to the second speed.
Figure 5:
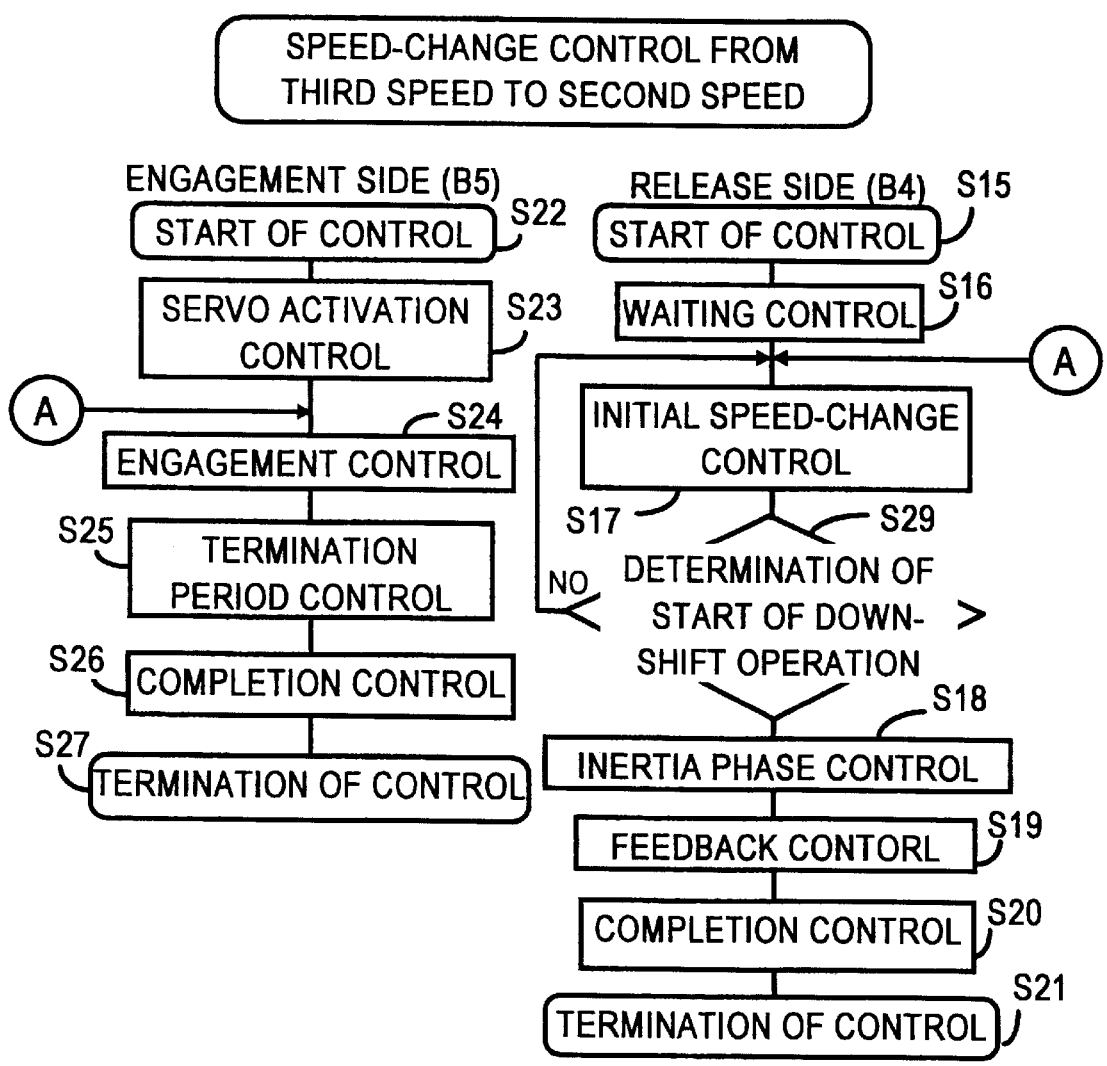

As previously described, when the automatic transmission 1 undergoes an up-shift operation from the second speed to the third speed, the so-called interchange speed-change operation is performed based on a command from the hydraulic pressure command means 21b of the control portion 21. That is, the fourth brake B4 on the engagement side is engaged and the fifth brake B5 on the release side is released. At this moment, the control unit 21 executes a control routine to issue commands to the linear solenoid valves SLS and SLU for regulation of hydraulic pressures applied to the engagement-side brake B4 and the release-side brake B5. The flowchart of this control routine is shown in FIG. 5, which illustrates the speed-change control from the second speed to the third speed. Control of the engagement side frictional engagement element (B4) is started in step 1, servo activation control is performed in step S2, and torque phase control is performed in step S3. Then, inertia phase (feedback) control is performed in step S4, termination period control is performed in step S6, and completion control is performed in step S7. The control routine is terminated in step 8 with the fourth brake B4 engaged. On the other hand control of the release side (B5) is started in step S9, normal waiting control is performed in step S10, and initial control is performed in step S11. Then, release control is performed in step S12 and the control routine is terminated in step S13, with the fifth brake B5 released. The primary control is of the engagement-side hydraulic pressure in performing an up-shift, and the release-side hydraulic pressure is controlled depending on the engagement-side hydraulic pressure.

On the other hand, when the down-shift operation from the third speed to the second speed is performed, the hydraulic pressure command means 21b of the control unit 21 issues commands to the linear solenoid valves SLS and SLU for control of the hydraulic pressures applied to the fourth brake B4 on the release side and the fifth brake B5 on the engagement side. The speed-change control from the third speed to the second speed is performed as shown in FIG. 5. Control of the release side (B4) is started in step S15, waiting control is performed in step S16, and initial speed-change control is performed in step S17. Then, inertia phase control is performed in step S18, feedback control is performed in step S19, and completion control is performed in step S20. Thus, the control is terminated in step S21. Control of the engagement side element (B5) is started in step S22, servo activation control is performed in step S23, and engagement control is performed in step S24. Then, termination period control is performed in step S25 and completion control is performed in step S26. Thus, the control is terminated in step S27. In general, the primary control is control of the release-side hydraulic pressure B4 in a down-shift, and the engagement-side hydraulic pressure is controlled depending on the release-side hydraulic pressure.

The speed-change control from the second speed to the third speed will now be described with reference to FIG. 6. In response to signals from the throttle opening degree sensor 23 and the vehicle speed sensor 26, which vary with operation of the accelerator pedal by the driver, it is determined, based on a speed-change map in the control unit 21, that the up-shift operation from the second speed to the third speed should be performed. After the lapse of a predetermined length of time for readying predetermined shift valves and the like, the up-shift speed-change control is started. In response to the start of the control, the hydraulic pressure command value (the electric signal supplied to the hydraulic pressure control means 27, i.e., linear solenoid SLS or SLU or the like, from the hydraulic pressure command means 21b) for the fourth brake B4 on the engagement side, which is released at the second speed, reaches a predetermined pressure $P_{S1}$, at which the piston of the engagement-side hydraulic servo moves to eliminate spacing between the plates of the engagement side frictional engagement element. After the predetermined pressure has been maintained for a predetermined length of time, the pressure is swept down with a predetermined gradient and maintained at a predetermined pressure $P_{S2}$ for a predetermined length of time. At the predetermined pressure $P_{S2}$, the state where the aforementioned spacing is eliminated (the state immediately before the frictional engagement element acquires torque capacity) is maintained. This represents the servo activation control performed in step S2.

At the same time, the hydraulic pressure command value (the electric signal supplied to the hydraulic pressure control means 28, i.e. the linear solenoid SLS and SLU and the like, from the hydraulic pressure command means 21b) for the fifth brake B5 on the release side, which is engaged at the second speed, reaches a predetermined pressure $P_W$, at which the fifth brake is maintained in a state of engagement based on the inputted torque. This represents the waiting control performed in step S10. The waiting control is synchronized with the servo activation control.

Then, the engagement-side hydraulic pressure B4 is swept up with a predetermined gradient. The up-sweep operation is continued until the pressure reaches an engagement target hydraulic pressure $P_{TA}$ immediately before the rotational speed of the input shaft starts to change. This state represents the torque phase control wherein the torque capacity of the fourth brake B4 increases with rotation of the second speed state and wherein only the distribution of torque between the fourth brake B4 and the release-side brake B5 changes (see step S3). On the other hand, the release-side hydraulic pressure B5 is swept down based on the release-side torque. The down-sweep of the release-side hydraulic pressure B5 depends on the aforementioned engagement-side hydraulic pressure B4. This state represents the initial control (see step S11) and corresponds to the torque phase control on the engagement side.

Upon increase of the torque capacity of the engagement-side frictional engagement element based on an increase in the aforementioned engagement-side hydraulic pressure B4, there occurs a change ω in rotational speed $N_T$ of the input shaft, and the rotational speed of the input shaft changes toward the third speed gear ratio. This state represents the inertia phase control (see step S4), and the release-side hydraulic pressure B5 is substantially released under release control (see step S12). The aforementioned inertia phase control corresponds to the release control. During the inertia phase control, the engagement hydraulic pressure P5 is subjected to feedback control such that the rotational speed $N_T$ of the input shaft becomes equal to a target value.

In general, the rotational speed $N_T$ of the input shaft has a generally upward gradient when the engine rotational speed increases, and has a generally downward gradient when the engine speed decreases. FIG. 6 shows how the rotational speed $N_T$ of the input shaft changes when it is assumed that the engine rotational speed remains constant.

The torque-down control will now be described with reference to FIGS. 7 and 6. In performing the aforementioned up-shift operation, if it is determined that the rotational speed $N_T$ of the input shaft has started to change and that the engagement-side control has entered the inertia phase, it is determined in step S31 that the torque-down operation of the engine should be started. Further, a predetermined torque-down amount TCU, corresponding to the inputted torque or the like, is calculated in step S32. In step S33, a torque-down signal based on the torque-down amount TCU is output from the control unit 21 to the engine control means 28 such as an electronic throttle system or the like. The electronic throttle system, which is an example of the engine control means, gives priority to the signal from the control unit 21 and controls the throttle opening degree, without depending on a signal from the throttle opening degree sensor 23 based on operation by the driver. In the case where the later-described down-shift control in step S34 is not performed (NO) and where it is determined in step S35 that the up-shift torque-down operation should not be terminated (NO), the torque-down output of the engine control means 28 is continued until those determinations are made affirmatively. Thereby, the engine torque is reduced, and the engaging force of the fourth brake B4, which is on the engagement side, is reduced. Thus, the shock caused at the time of the speed-change operation due to the interchange of engagement between the engagement and release side frictional engagement elements is attenuated.

The torque phase control may be composed of a first sweep operation wherein the engagement-side hydraulic pressure B4 approaches a target hydraulic pressure that is calculated immediately before the inertia phase and a second sweep operation which has a gentler gradient than the first sweep operation. Simultaneously with the start of the second sweep operation, it may be determined that the torque-down operation should be started. In this case, the torque-down operation may be performed with a sweep gradient that has been calculated in accordance with the amount of change in engagement hydraulic pressure having the second sweep gradient (see Japanese Patent Application Laid-Open No. HEI 10-184410).

Figure 6:
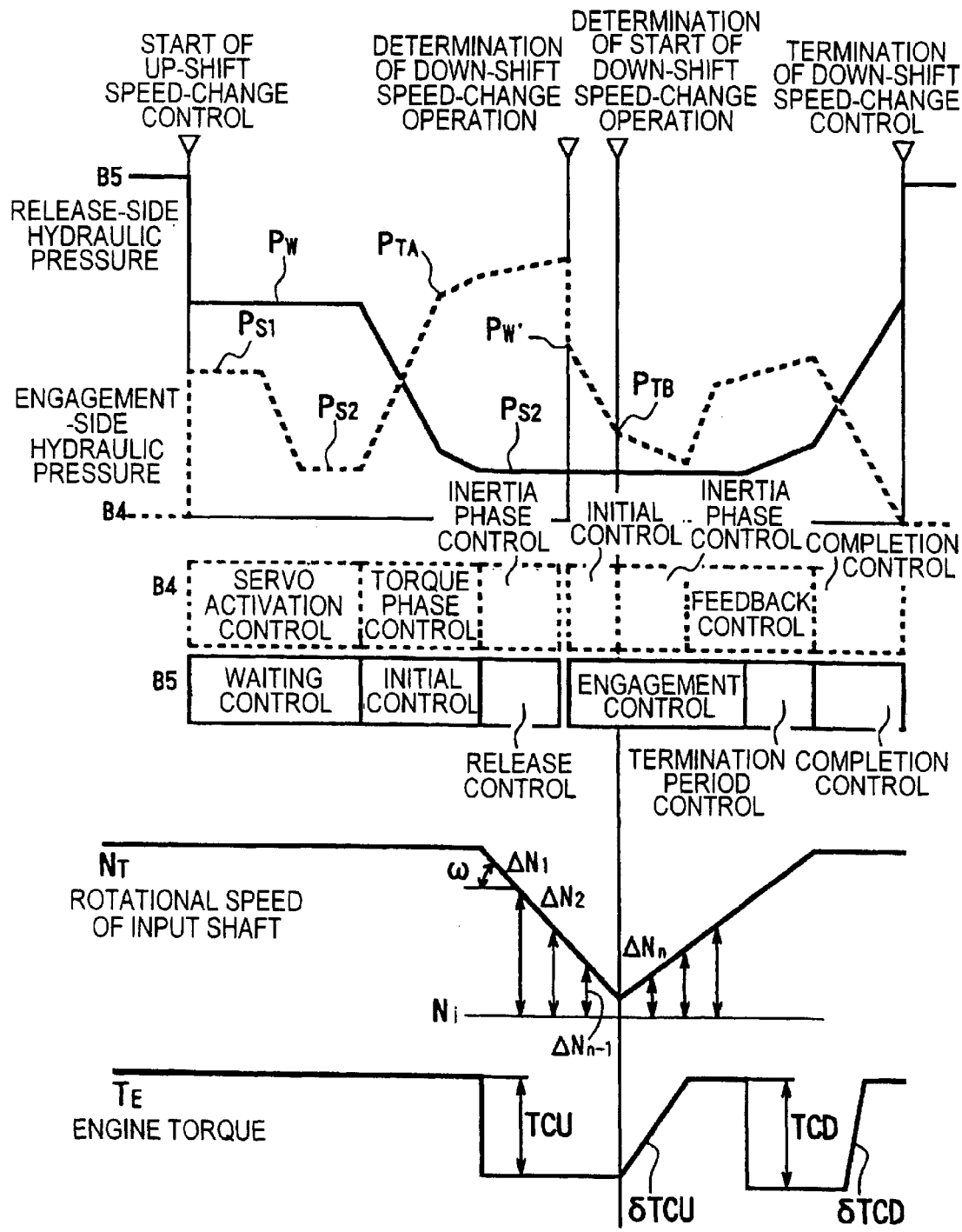
FIG. 6 is a time chart showing a multiple speed-change operation from the second speed through the third speed to the second speed, according to the present invention.

Referring now to the flow chart shown in FIG. 5 and a time chart shown in FIG. 6, during the up-shift operation from the second speed to the third speed, a speed-change command to establish the second speed, that is, a command to perform the down-shift operation from the third speed to the second speed may be issued, as in a kick-down wherein the driver depresses the accelerator pedal (multiple speed-change operation). In other words, in performing the inertia phase control and the release control during the speed-change from the second speed to the third speed, it is determined in step S14 (FIG. 5) that the down-shift operation (from the third speed to the second speed) should be performed (YES). Then, the control operations (steps S6, S7 and the like) following the up-shift operation from the second speed to the third speed are suspended, and control of the speed-change from the third speed to the second speed takes over immediately. In this process, the fourth brake B4 that is on the engagement side during control of the speed-change from the second speed to the third speed is shifted to the release side, whereas the fifth brake B5 that is on the release side during control of the speed-change from the second speed to the third speed is shifted to the engagement side. Even during control of the speed-change control from the third speed to the second speed, the servo activation control (step S23) and the waiting control (S16) are skipped. As for the hydraulic pressure B4 that has been shifted to the release-side, the initial speed-change control (step S17) is first performed. As for the hydraulic pressure B5 that has been shifted to the engagement side, the engagement control (step S24) is first performed.

In the initial speed-change control (step S16) for the release-side hydraulic pressure B4, which serves as the primary control, a target hydraulic pressure $P_{TB}$ is first calculated based on the release-side torque, using a waiting engagement pressure $P_W$, that is calculated from the inputted torque. Then, the sweeping-down operation toward the target torque is performed. The aforementioned target hydraulic pressure $P_{TB}$ corresponds to a threshold value that does not cause a change in rotational speed of the input shaft. Then, if the input shaft rotational speed sensor 25 detects in step S29 that the direction of the change in rotational speed $N_T$ of the input shaft has been reversed, the inertia phase control is initiated in step S18. The release-side hydraulic pressure B4 is swept down with a predetermined gradient.

Figure 7:
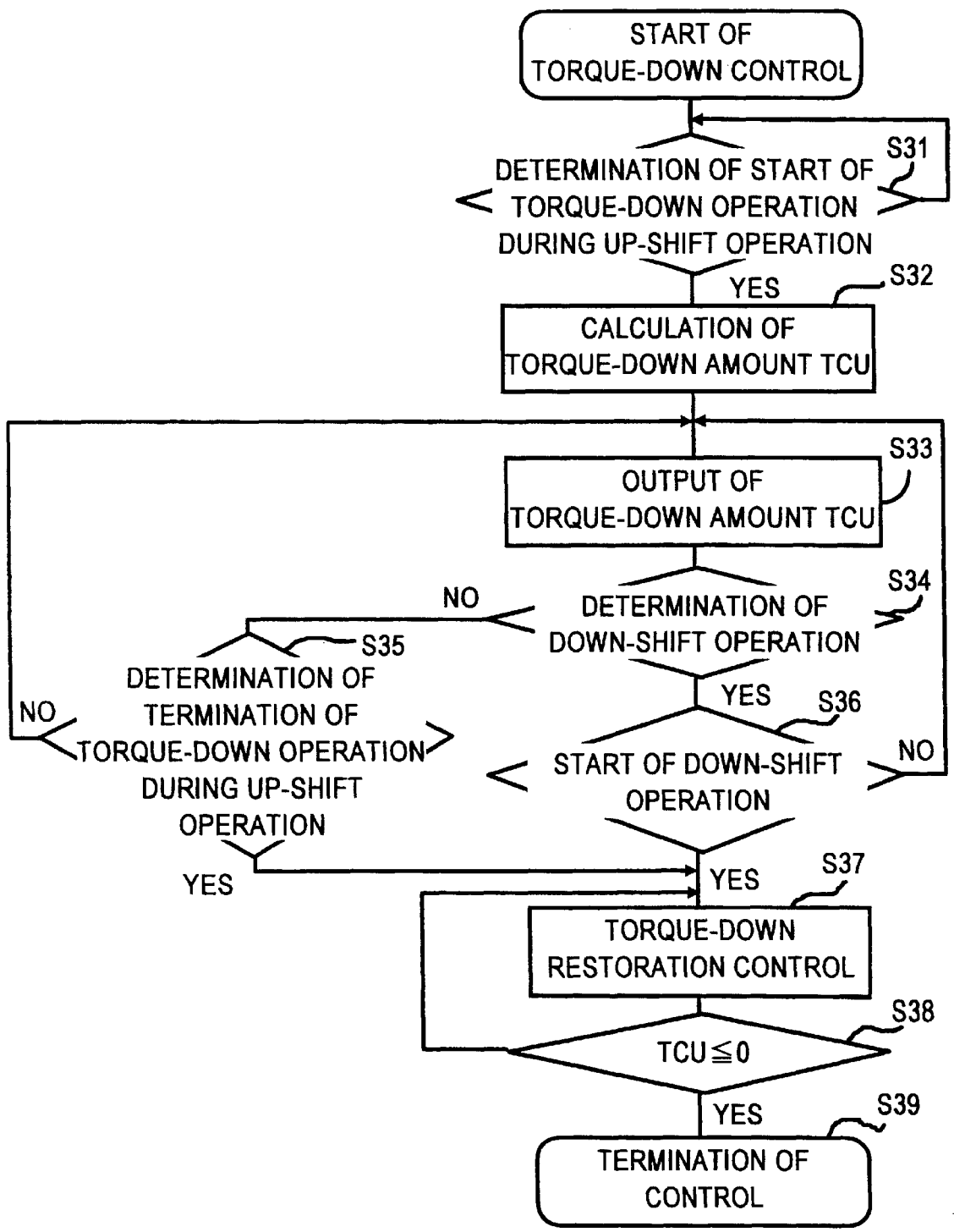
FIG. 7 is a flowchart of a routine for torque-down control during the multiple speed-change operation from the second speed through the third speed to the second speed.

Then, as described above, if it is determined that the direction of the change (gradient) in rotational speed $N_T$ of the input shaft has been changed from the up-shift direction for establishing the third speed to the down-shift direction for establishing the second speed, the torque-down control of the engine also undergoes the determination of the down-shift operation (step S34) shown in FIG. 7. The determination of the down-shift operation may be made simultaneously with the determination of the start of the inertia phase shown in step S29 (FIG. 5). Alternatively, the determination of the down-shift operation may be made at a slightly different timing from the determination of the start of the inertia phase because of the difference in determination for detection (once or twice).

It may be determined that the aforementioned down-shift control should be performed, when the sign of the gradient of the change ω in rotational speed of the input shaft is switched. Alternatively, the differences (ΔN1, ΔN2 ... ΔNn ... between the rotational speed Ni of the output shaft in third speed gear ratio and the actual rotational speed $N_T$ of the input shaft are calculated. Then, the value of ΔN is compared with the preceding difference $ΔN_{n-1}$ in rotational speed. It may be determined that the down-shift control should be performed, when the direction of the change in difference between the values ΔN and $ΔN_{n-1}$ is reversed.

In the case where the determination of the down-shift operation has been made affirmatively in step S34 and the down-shift operation has been started as described above (YES in step S36), torque restoration control is performed in step S37. The engine torque $T_E$ rises with a predetermined gradient δTCU and is restored. The aforementioned restoration control is continued in step S38 until the torque-down amount TCU corrected at the time of the up-shift operation becomes zero. When the torque-down amount becomes zero, the engine torque $T_E$ becomes the torque intrinsic to the operation of the accelerator pedal by the driver. Thus, the control is terminated in step S39.

Then, if the state where the change in rotational speed of the input shaft can be detected stably is established, the release-side hydraulic pressure B4 enters the feedback control in step S19. The hydraulic pressure is then controlled with a target value set to the change amount (acceleration) ω of the rotational speed $N_T$ of the input shaft. On the other hand, in performing the engagement control after the start of the down-shift speed-change control, the engagement-side hydraulic pressure B5 is maintained at a predetermined low pressure PS2, which is a threshold value that determines whether or not the frictional engagement element (the fifth brake B5) has a torque capacity. Then, the termination period control is performed in step S25, and the sweeping-up operation is performed with a predetermined gradient. In accordance with a rise in the engagement-side hydraulic pressure B5, the aforementioned release-side hydraulic pressure B4 is subjected to the feedback control. Upon termination of the feedback control on the release side and the termination period control on the engagement side, the completion control is performed in steps S20 and S27. That is, the engagement-side hydraulic pressure B5 rises with a predetermined gradient, and the release-side hydraulic pressure B4 drops with a predetermined gradient. Thus, the multiple speed-change control from the second speed through the third speed to the second speed is terminated in steps S21 and S27.

The down-shift operation from the third speed to the second speed, initiated during a speed-change operation from the second speed to the third speed, has been described for the case of a down-shift operation resulting from the kick-down, namely, the case where both the throttle opening degree and the required torque are large. Under such circumstances, primary control is based on the hydraulic pressure for the fourth brake B4 that has been shifted to the release side. Conversely, in the case of a manual down-shift, namely, the case where the driver has established the manual position as that of second speed in the D range, both the throttle opening degree and the required torque are small. Therefore, the primary control is of the hydraulic pressure for the fifth brake B5 that has been shifted to the engagement side. Even during down-shift primary hydraulic pressure control of the engagement side, the aforementioned torque-down control shown in FIG. 7 is performed in the same manner.

In the torque-down control of the engine torque $T_E$, as shown in FIG. 6, even during the down-shift operation, the torque is reduced by a predetermined torque-down amount TCD in accordance with the termination period control for the engagement-side hydraulic pressure B5. This represents the control for reducing the inputted torque so as to allow engagement of the engagement-side frictional engagement element (B5) with a relatively low hydraulic pressure.

Figure 8:
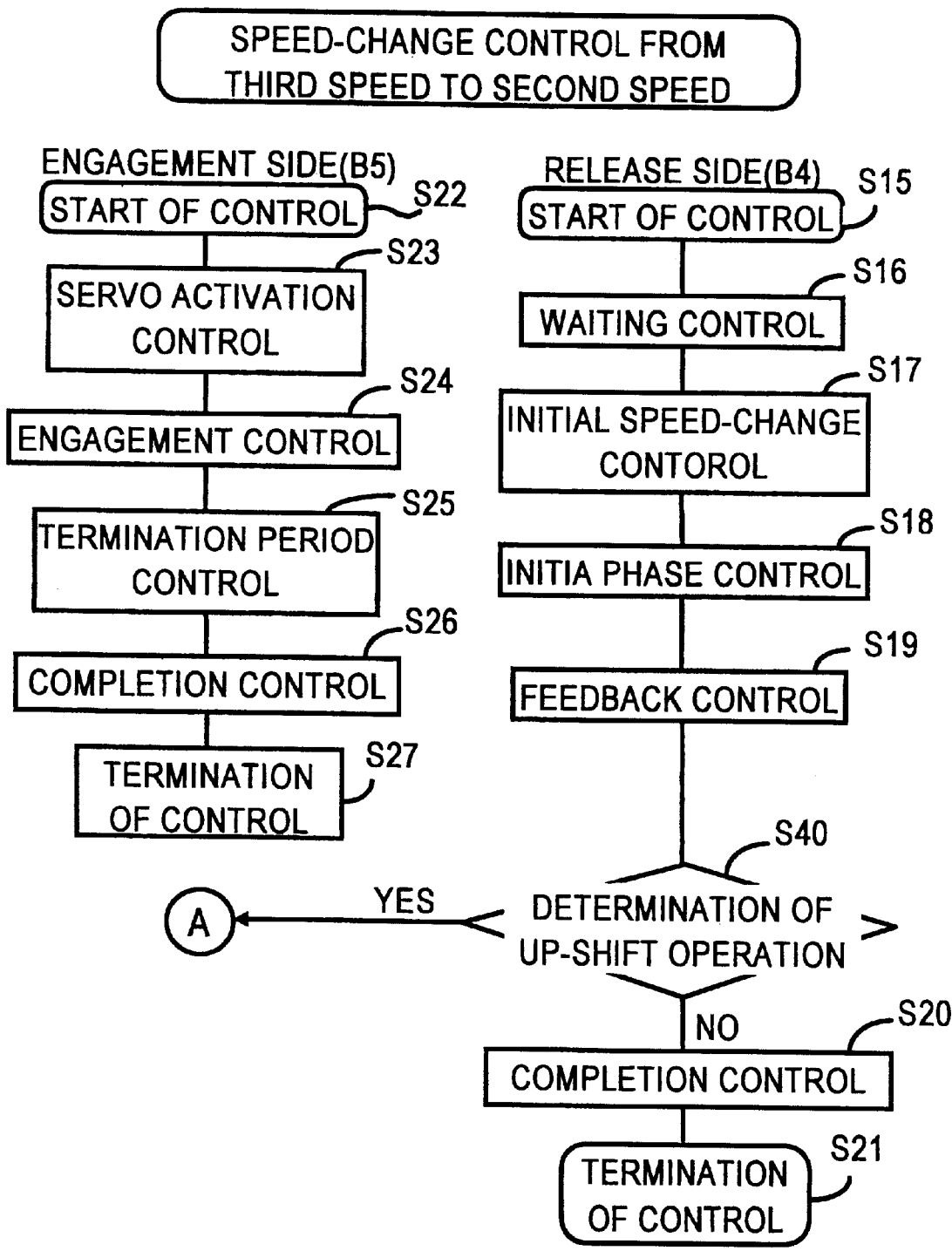
FIGS. 8(a) and 8(b) are flowcharts of a routine for a multiple speed-change operation from the third speed through the second speed to the third speed.
Figure 8:
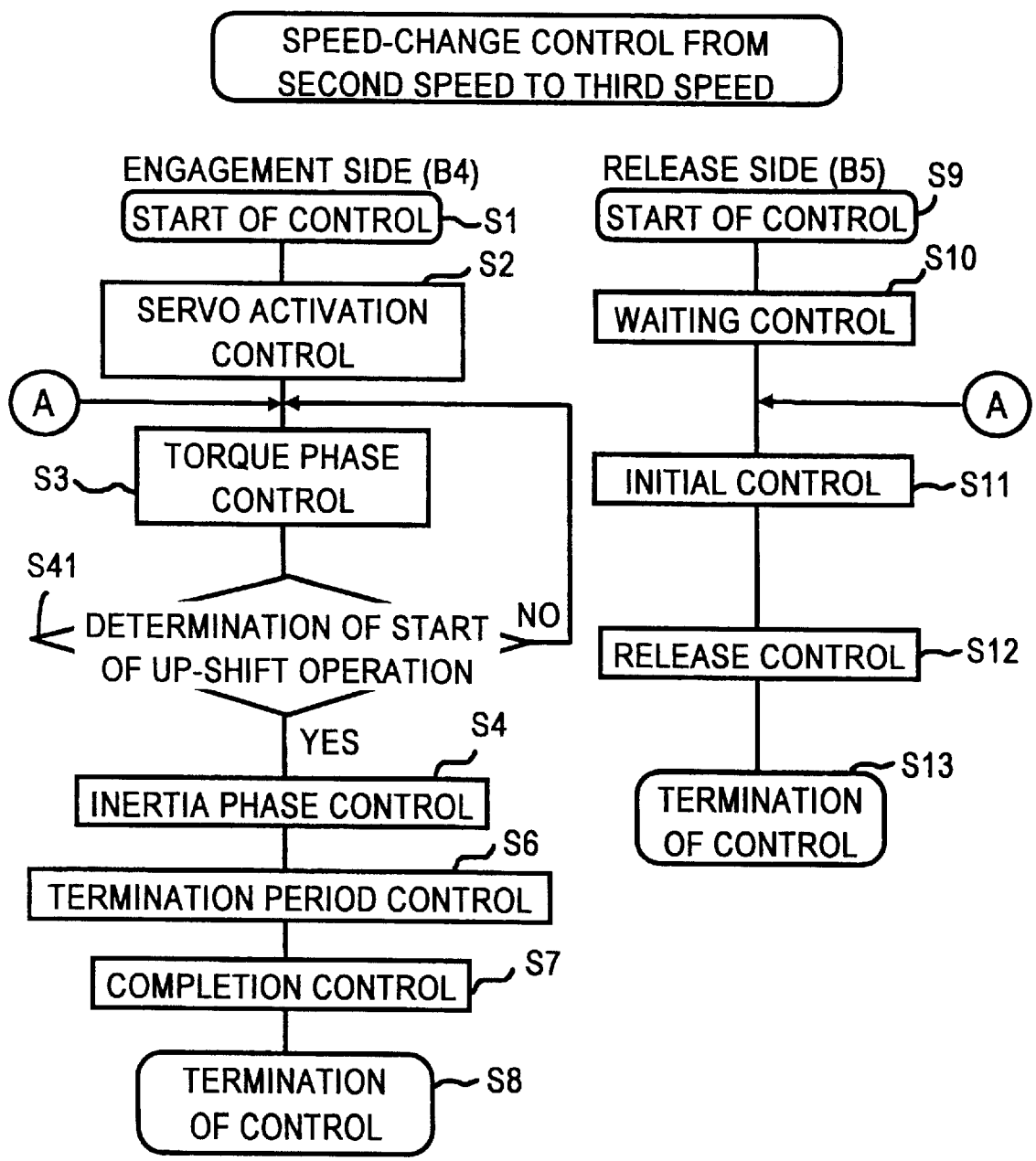

Next, the multiple speed-change operation, which is performed in the case where a command to perform the up-shift operation (e.g. from the second speed to the third speed) has been issued during the down-shift operation (e.g. from the third speed to the second speed), will be described with reference to FIGS. 8, 9 and 10. FIG. 8 shows a flowchart for the speed-change control from the third speed to the second speed and the speed-change control from the second speed to the third speed. The flowchart shown in FIG. 8 is the same as that shown in FIG. 5 except for the portion which determines whether or not the up-shift (down-shift) operation should be started. Therefore, referring to FIG. 8, the control operations identical to those shown in FIG. 5 are denoted by the same reference symbols and will not be explained.

When the speed-change operation from the third speed to the second speed is performed, the fourth brake B4 is on the release side and the fifth brake B5 is on the engagement side. Based on a control signal shown in FIG. 9, which is supplied to the hydraulic pressure control means 27, e.g., linear throttles SLS, SLU or the like, from the control unit 21, the hydraulic pressures supplied to the hydraulic servos 29 and 30 for the respective brakes are controlled.

If it is determined based on the map in the control unit 21 that the down-shift speed-change operation (from the third speed to the second speed) should be performed, the release-side hydraulic pressure B4, which is subject to primary control, becomes equal to the waiting engagement pressure $P_W$ that has been calculated based on the input torque (the waiting pressure control; step S16). Then, the target hydraulic pressure $P_{TA}$ is calculated based on the release-side torque, and the sweeping-down toward the target hydraulic pressure is performed (the initial control; step S17). On the other hand, the engagement-side hydraulic pressure B5 is set to the predetermined pressure $P_{S1}$ for eliminating the looseness (closing spaces between plates) of the frictional engagement element through a stroke of the piston of the hydraulic servo, and then is maintained at the hydraulic pressure $P_{S2}$ predetermined to maintain the state immediately preceding torque transfer (the servo activation control; step S23).

Furthermore, the target hydraulic pressure PTA that has been calculated based on the release-side torque corresponds to a threshold value for the pressure immediately preceding change in rotational speed $N_T$ of the input shaft. Then, if a change in rotational speed $N_T$ of the input shaft is detected, the sweep-down operation is further performed with a predetermined gradient. This represents the inertia phase control (step S18). Then, the release-side hydraulic pressure B4 is subjected to the feedback control (the feedback control; step S19) such that the change amount (acceleration) ω of the rotational speed of the input shaft becomes equal to the target value. On the other hand, the engagement-side hydraulic pressure is maintained at the predetermined pressure $P_{S2}$ (the engagement control; step S24).

Figure 9:
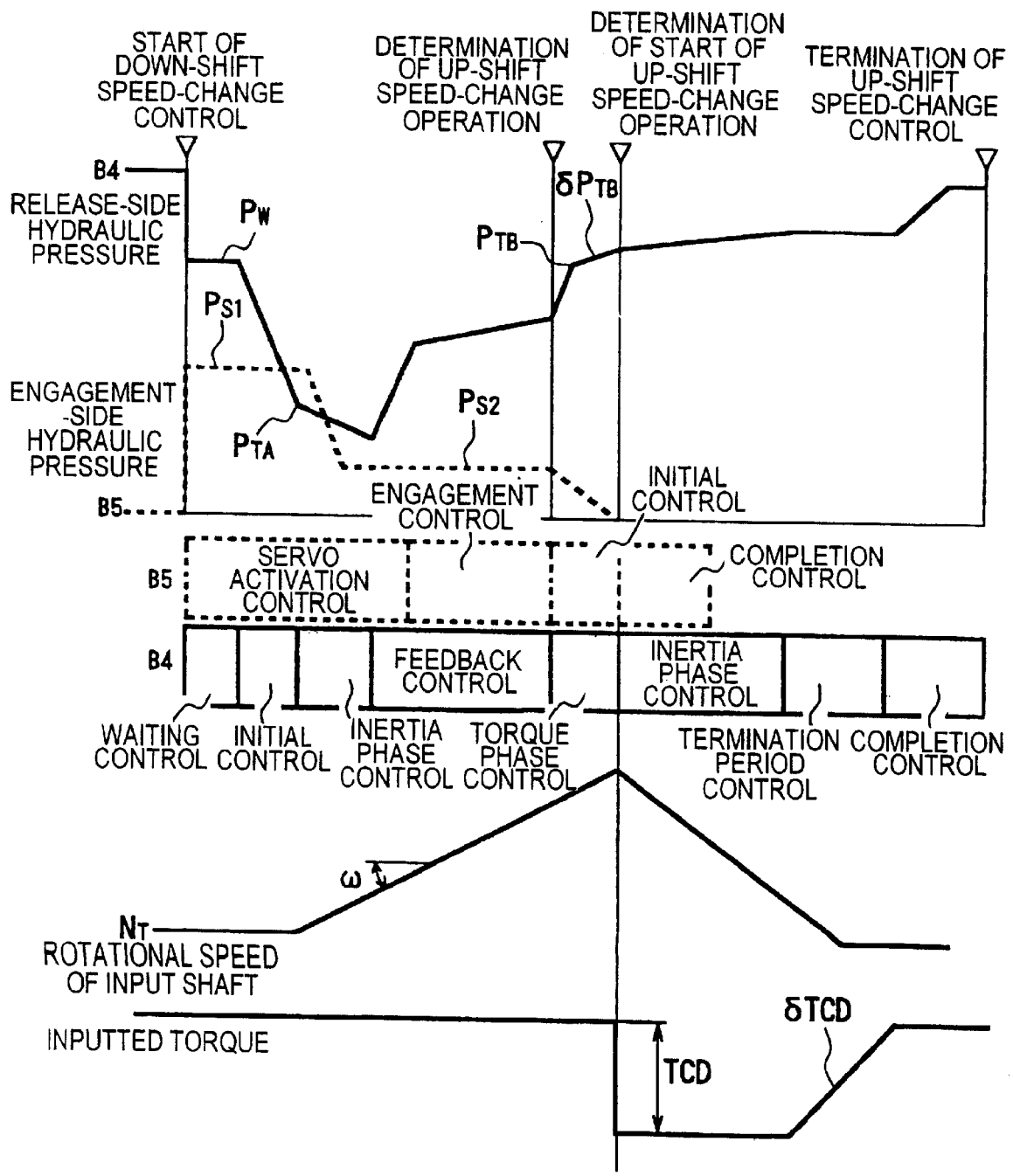
FIG. 9 is a time chart showing the multiple speed-change operation from the third speed through the second speed to the third speed according to the present invention.
Figure 10:
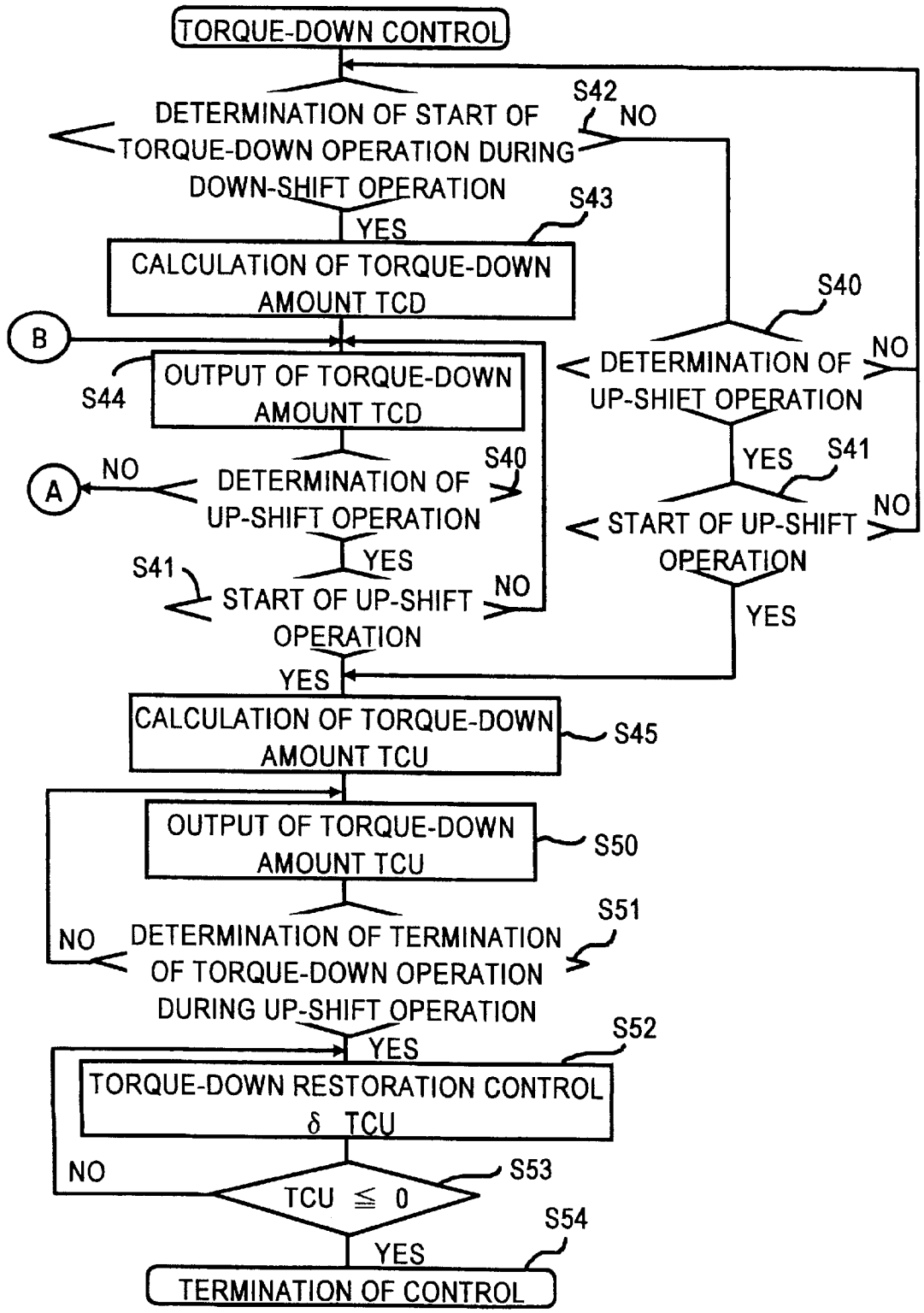
FIGS. 10(a) and 10(b) are flowcharts of a routine for torque-down control during the multiple speed-change operation from the third speed through the second speed to the third speed.
Figure 10:
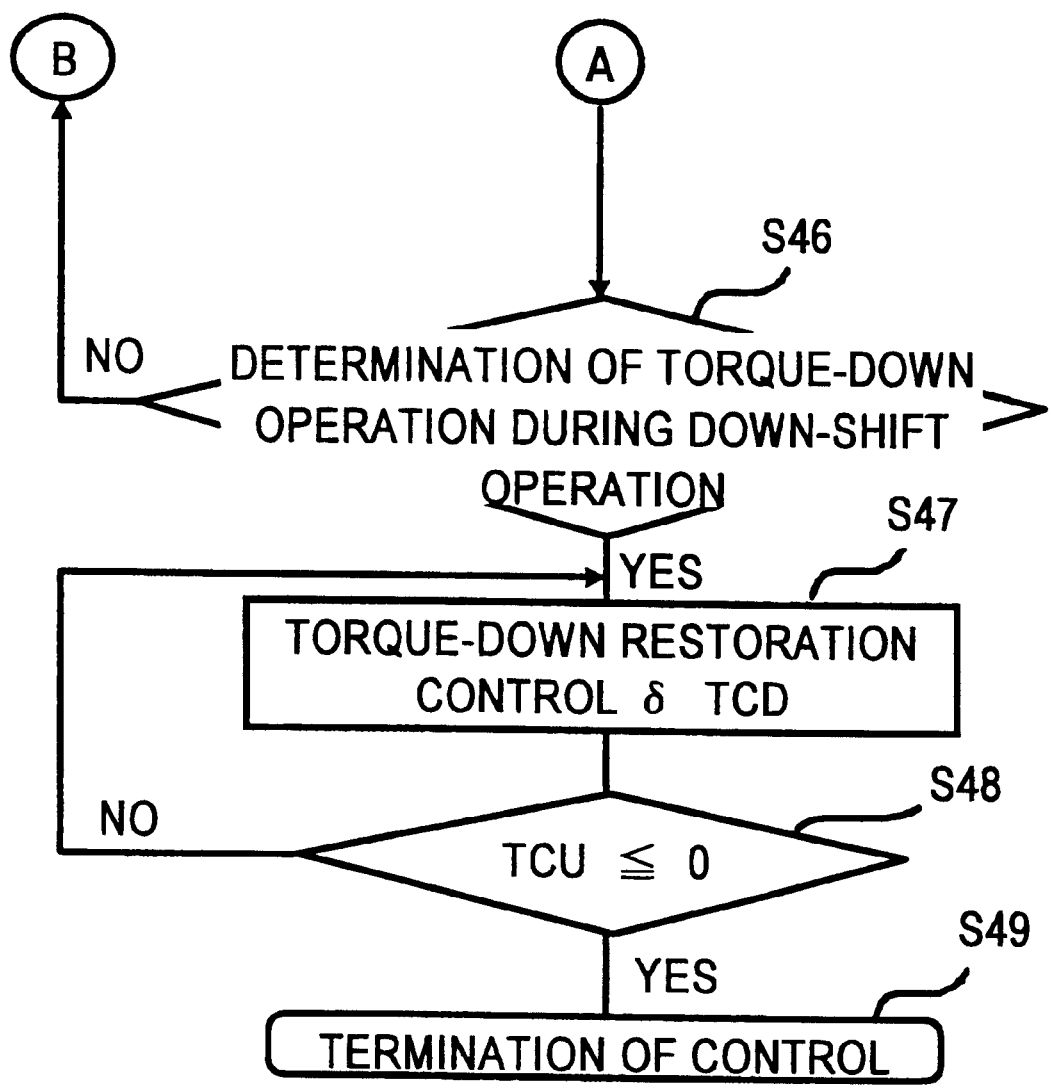
Figure 11:
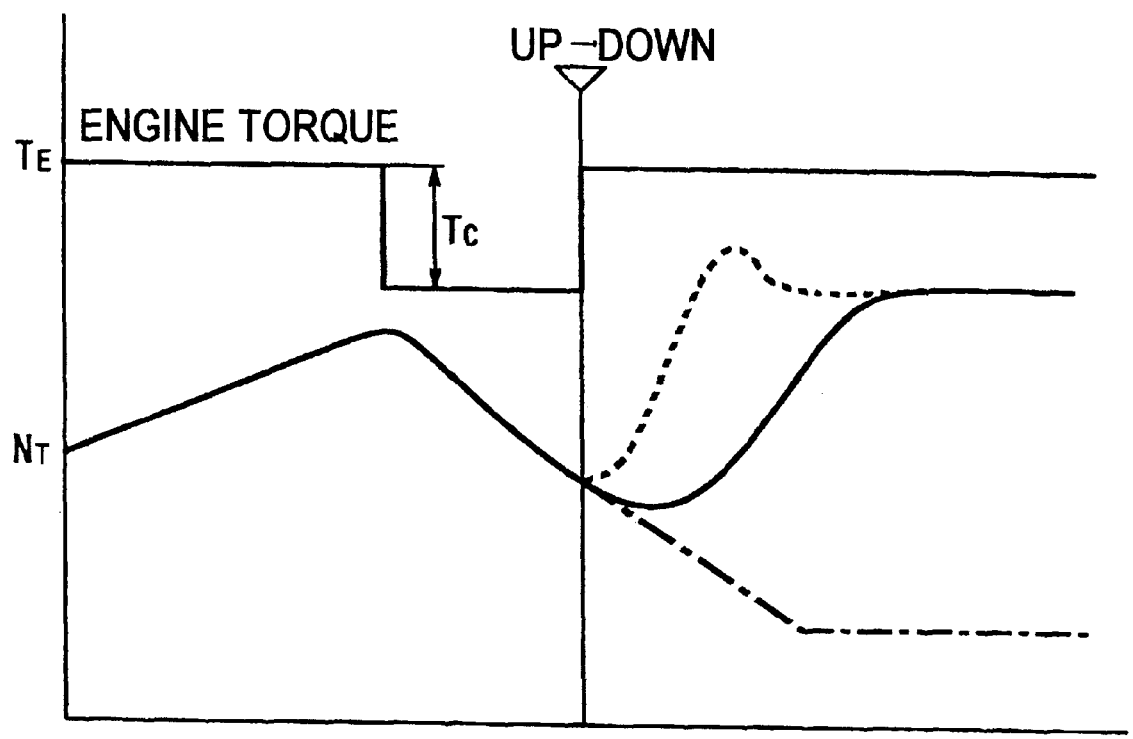
FIG. 11 is a graph showing changes in rotational speed of an input shaft resulting from the torque-down control.

FIG. 9 shows only the rotational speed $N_T$ of the input shaft changing in accordance with changes in gear ratio, assuming that the engine rotational speed is constant. The time chart shown in FIG. 9 shows the down-shift operation in a power-on state such as the kick-down and the like. However, the time chart is also applicable to a power-off down-shift operation such as coast-down.

In performing the down-shift operation from the third speed to the second speed, for example during the feedback control, if it is determined because of a manual operation or depression of the accelerator that an up-shift operation (from the second speed to the third speed) should be performed (YES in step S40 in FIG. 8), the residual speed-change control from the third speed to the second speed (the termination period control in step S25 and the completion control in steps S20 and S26) is suspended immediately. Then, the speed-change control from the second speed to the third speed takes over. In this case, even during the speed-change control from the second speed to the third speed, the engagement-side hydraulic pressure control dispenses with the servo activation control (step S2) and starts with the torque phase control (step S3). The release-side hydraulic pressure control dispenses with the waiting control (step S10) and starts with the initial control (step S11).

In performing the up-shift operation, the engagement-side hydraulic pressure generally receives primary control. The hydraulic pressure for the fourth brake B4 that has been shifted to the engagement-side undergoes the sweeping-up operation toward the engagement target hydraulic pressure $P_{TB}$ calculated from the engagement-side torque. The sweeping-up operation is further continued with a predetermined gradient $\delta P_{TB}$ that is calculated based on a target rotational speed change rate at the time when the rotational speed of the input shaft starts to change. As for the engagement-side hydraulic pressure B4, the aforementioned two-stage sweeping-up operations constitute the torque phase control (step S3). On the other hand, as for the hydraulic pressure for the fifth brake B5 that has been shifted to the release side, the sweeping-down operation is performed from the predetermined pressure $P_{S2}$ with a predetermined gradient. The sweeping-down operation constitutes the initial control. Thus, the control is terminated.

Then, if the direction of the change (acceleration) ω in rotational speed $N_T$ of the input shaft shifts from the down-shift is direction to the up-shift operation based on a rise in the engagement-side hydraulic pressure B4, it is determined in step S41 that the up-shift operation should be started. The engagement-side hydraulic pressure B4 undergoes the inertia phase control (step S4), in which the sweeping-up operation is performed with a relatively gentle gradient. The sweeping-up operation is continued and followed by the termination period control (step S6) and the completion control (step S7).

Torque-down control of the engine will now be described with reference to FIG. 10. First of all, it is determined in step S42 whether or not the torque-down for the down-shift operation should be started. If the result is affirmative, the torque-down amount TCD is calculated in step S43, and the torque-down amount is outputted in step S44. As indicated by the engine torque $T_E$ shown in FIG. 6, this represents the control for reducing the engine torque TE by the predetermined amount TCD in accordance with the engagement-side termination period control (step S25) for the down-shift operation. Referring to FIG. 9, in performing the down-shift operation from the third speed to the second speed, a speed-change command to switch to the up-shift operation from the second speed to the third speed is issued prior to the start of the terminal period control (step S25) wherein the engagement-side hydraulic pressure B5 rises. Therefore, the aforementioned torque-down amount (TCD) is not output (and thus not shown in the drawing). That is, the result is negative in step S42, it is determined that the up-shift operation should be performed (the result in step S40 of FIGS. 8 and 10 is affirmative), and it is determined that the up-shift operation should be started (the result in step S41 of FIGS. 8 and 10 is affirmative). Thus, the process proceeds to step S45.

On the other hand, if it has not been determined that the up-shift operation should be performed, the torque-down output TCD (see step S44 and FIG. 6) during the aforementioned down-shift operation continues until it is determined in step S46 that the torque-down operation should be terminated. Then, if it is determined that the torque-down operation should be terminated, the engine torque is restored and raised with a predetermined gradient ωTCD in step S47. The restoration control is continued in step S48 until the torque-down amount TCD becomes zero and until the engine torque $T_E$ becomes equal to the torque intrinsic to the operation of the accelerator pedal by the driver. Then, the control is terminated in step S49.

As shown in FIG. 9, when the up-shift operation is started (the result in step S41 is affirmative), namely, when the direction of the change in rotational speed of the input shaft has changed, the torque-down amount TCU for the up-shift operation is calculated in step S45. The torque-down amount is outputted in step S50. In outputting the torque-down amount TCD based on the down-shift operation, if it is determined that the up-shift operation should be performed (step S40; YES) and that the up-shift operation should be started (step S41; YES), the torque-down procedure for the down-shift operation is continued with the torque-down amount changed (TCD→TCU).

Furthermore, the outputting of the torque-down amount for the aforementioned up-shift operation is continued until the determination of the termination of the torque control, namely, when the inertia phase control (step S4) of the engagement-side hydraulic pressure substantially corresponds to the termination (step S51). After it has been determined that the torque control should be terminated, the torque is restored and raised with a predetermined gradient δTCU (step S52). The torque continues to be raised until the aforementioned torque-down amount TCD becomes zero, that is, until the engine torque TE becomes equal to the torque intrinsic to the operation by the driver (step S53). Then, the torque-down control is terminated. As is the case with FIG. 6, determination of the start of the up-shift operation, which represents the start of the torque-down control during the aforementioned up-shift operation, may be detected as a change in rotational speed (acceleration) ω of the input shaft from positive to negative or vice versa (change in "sign" of the change in rotational speed), or may be detected as a change in the sign of the difference ΔN in rotational speed of the input shaft between (1) a gear ratio before the speed-change operation and (2) a gear ratio after the speed-change operation.

The aforementioned embodiment has been described as multiple speed-change operations from the second speed through the third speed to the second speed and from the third speed through the second speed to the third speed. However, the present invention is not so limited. Needless to say, the present invention is also applicable to other multiple speed-change operations based on the switching between an up-shift operation and a down-shift operation.

While the present invention has been described with reference to what is presently considered to be a preferred embodiment thereof, it is to be understood that the present invention is not limited to the disclosed embodiment or construction. On the contrary, the present invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the present invention.

What is claimed is:

1. A speed-change control apparatus for an automatic transmission, comprising:
    a transmission input shaft which receives power from an engine output shaft;
    a transmission output shaft coupled to wheels;
    a plurality of frictional engagement elements for changing between different power transmission paths between the transmission input and output shafts;
    hydraulic servos for operatively engaging and releasing the frictional engagement elements;
    hydraulic pressure control means for controlling hydraulic pressures applied to the hydraulic servos;
    engine control means for controlling an output torque of the engine, including torque-down control to reduce engine torque;
    a controller for receiving signals from respective sensors which detect various vehicle running conditions and for outputting signals to the hydraulic pressure control means and the engine control means;
    multiple speed-change determination means for determining a multiple speed-change operation when, during one of an up-shift speed-change operation and a down-shift speed-change operation, a command to perform the other speed-change operation has been issued;
    hydraulic pressure command means for switching from a first hydraulic pressure command for performing said one speed-change operation to a second hydraulic pressure command for performing the other of the speed-change operations, and for outputting the second hydraulic pressure command to the hydraulic pressure control responsive to determination of the multiple speed-change operation;
    speed-change start determination means for detecting that said one speed-change operation has been switched to the other speed change operation by the hydraulic pressure control performed by the hydraulic pressure control means responsive to the switch of hydraulic pressure commands, and for determining that the other speed-change operation has actually started; and
    engine torque change means for issuing a command to change a torque-down control by the engine control means responsive to a determination that the other speed-change operation has started.

2. The speed-change control apparatus according to claim 1, wherein:
    the speed-change start determination means detects and determines that the direction of change in rotational speed of the input shaft has changed.

3. The speed-change control apparatus according to claim 1, wherein:
    the engine control means reduces engine torque by a predetermined amount when both a hydraulic pressure applied to the hydraulic servo for the engagement side frictional engagement element during an up-shift operation and torque capacity of the frictional engagement element increase.

4. The speed-change control apparatus according to claim 2, wherein:
    the engine control means reduces engine torque by a predetermined amount when both a hydraulic pressure applied to the hydraulic servo for the engagement side frictional engagement element during an up-shift operation and torque capacity of the frictional engagement element increase.

5. The speed-change control apparatus according to claim 3, wherein:
    the engine torque change means issues a command to suspend reduction of the engine torque by the predetermined amount, based on the determination of the start of the other speed-change operation when the other speed-change operation is a down-shift operation.

6. The speed-change control apparatus according to claim 4, wherein:
    the engine torque change means issues a command to suspend reduction of the engine torque by the predetermined amount, based on the determination of the start of the other speed-change operation when the other speed-change operation is a down-shift operation.

7. The speed-change control apparatus according to claim 3, wherein:
    the engine torque change means issues a command to start reduction of the engine torque by the predetermined amount, based on the determination of the start of the other speed-change operation when the other speed-change operation is an up-shift operation.

8. The speed-change control apparatus according to claim 4, wherein:
    the engine torque change means issues a command to start reduction of the engine torque by the predetermined amount, based on the determination of the start of the other speed-change operation when the other speed-change operation is an up-shift operation.

9. The speed-change control apparatus according to claim 3, wherein:
    the engine torque change means issues a command to terminate reduction of the engine torque by the predetermined amount, and the engine control means then gradually raises the engine torque, with a predetermined gradient, to an intrinsic torque.

10. The speed-change control apparatus according to claim 4, wherein:
    the engine torque change means issues a command to terminate reduction of the engine torque by the predetermined amount, and the engine control means then gradually raises the engine torque, with a predetermined gradient, to an intrinsic torque.

11. The speed-change control apparatus according to claim 5, wherein:
    the engine torque change means issues a command to terminate reduction of the engine torque by the predetermined amount, and the engine control means then gradually raises the engine torque, with a predetermined gradient, to an intrinsic torque.

12. The speed-change control apparatus according to claim 6, wherein:
    the engine torque change means issues a command to terminate reduction of the engine torque by the predetermined amount, and the engine control means then gradually raises the engine torque, with a predetermined gradient, to an intrinsic torque.

13. The speed-change control apparatus according to claim 7, wherein:

the engine torque change means issues a command to terminate reduction of the engine torque by the predetermined amount, and the engine control means then gradually raises the engine torque, with a predetermined gradient, to an intrinsic torque.

14. The speed-change control apparatus according to claim 8, wherein:

the engine torque change means issues a command to terminate reduction of the engine torque by the predetermined amount, and the engine control means then gradually raises the engine torque, with a predetermined gradient, to an intrinsic torque.

\* \* \* \* \*

UNITED STATES PATENT AND TRADEMARK OFFICE
CERTIFICATE OF CORRECTION

PATENT NO. : 6,254,508 B1
DATED : July 3, 2001
INVENTOR(S) : Kojima et al.

It is certified that error appears in the above-identified patent and that said Letters Patent is hereby corrected as shown below:

Column 6,
Line 27, "BE)" should read -- B1 --

Column 7,
Line 24, delete "10"

Signed and Sealed this

First Day of October, 2002

Attest:

Attesting Officer

JAMES E. ROGAN
Director of the United States Patent and Trademark Office